US009284877B2

(12) United States Patent
Yoo et al.

(10) Patent No.: US 9,284,877 B2
(45) Date of Patent: Mar. 15, 2016

(54) COMBUSTION CHAMBER OF DIRECT INJECTION DIESEL ENGINE FOR REDUCING THE NOX

(71) Applicant: DOOSAN INFRACORE CO., LTD., Incheon (KR)

(72) Inventors: Doc Koon Yoo, Gyeonggi-do (KR); Chung Min Kim, Incheon (KR); Jong Mo Ahn, Incheon (KR); Dae Sung Han, Incheon (KR); Jin Hwan Yu, Incheon (KR); Wook Jung, Incheon (KR); Duk Sang Kim, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 254 days.

(21) Appl. No.: 13/971,338

(22) Filed: Aug. 20, 2013

(65) Prior Publication Data

US 2014/0076275 A1    Mar. 20, 2014

(30) Foreign Application Priority Data

Sep. 14, 2012  (KR) .................. 10-2012-0102347

(51) Int. Cl.
*F02B 23/06* (2006.01)
*F02B 19/14* (2006.01)

(52) U.S. Cl.
CPC ............ *F02B 19/14* (2013.01); *F02B 23/0696* (2013.01); *F02B 23/0651* (2013.01); *Y02T 10/125* (2013.01)

(58) Field of Classification Search
CPC ... F02B 19/14; F02B 23/0651; F02B 23/0696

USPC ................ 123/253, 262, 263, 279, 280, 285, 123/193.6
See application file for complete search history.

(56) References Cited

U.S. PATENT DOCUMENTS 4,270,494 A * 6/1981 Garter et al. ............... 123/41.35
6,997,158 B1 * 2/2006 Liu ............................. 123/279
(Continued)

FOREIGN PATENT DOCUMENTS

| CN | 1395028 A | 2/2003 |
|---|---|---|
| CN | 1802492 A | 7/2006 |

(Continued)

OTHER PUBLICATIONS

Chinese Office Action dated Jun. 30, 2015 for Chinese Application No. 201310418269.7, 6 pages.

*Primary Examiner* — Mahmoud Gimie
(74) *Attorney, Agent, or Firm* — John D. Veldhuis-Kroeze; Westman, Champlin & Koehler, P.A.

(57) ABSTRACT

Disclosed is a combustion chamber of a diesel engine provided with a bowl having a concave shape so that fuel injected from an injector creates a swirl or squishing flow to be mixed with air, and the combustion chamber of the diesel engine includes: a pip protruding from a center of a lower surface of the bowl toward the injector; a lip part protruding from a side surface of the bowl toward the injector; and a main combustion chamber provided on a lower portion of the lip part and a sub combustion chamber provided on an upper portion of the lip part, with the lip part interposed therebetween, in which a surface of the sub combustion chamber is formed in a flat shape or a concave bowl shape to have a depth of the sub combustion chamber of 0.8 mm or lower.

5 Claims, 7 Drawing Sheets

| Case | Th(thickness) | Normalized NOx(g/kwh) |
|---|---|---|
| 1 | 1.4 mm | 1.3 |
| 2 | 1.2 mm | 1.1 |
| 3 | 1.0 mm | 1 |
| 4 | 0.8 mm | 0.96 |
| 5 | 0.5 mm | 0.94 |
| 6 | 0.2 mm | 0.91 |
| 7 | 0 | 0.91 |

(56) References Cited

U.S. PATENT DOCUMENTS

| | | | |
|---|---|---|---|
| 7,073,478 B2* | 7/2006 | Zoller | 123/276 |
| 7,918,206 B2* | 4/2011 | Eismark et al. | 123/298 |
| 8,156,927 B2* | 4/2012 | Iikubo et al. | 123/661 |
| 2004/0123832 A1* | 7/2004 | Quigley et al. | 123/276 |
| 2007/0079775 A1* | 4/2007 | Lin et al. | 123/41.35 |
| 2009/0025675 A1* | 1/2009 | Ilkubo et al. | 123/193.6 |
| 2014/0331957 A1* | 11/2014 | Nishida et al. | 123/193.1 |

FOREIGN PATENT DOCUMENTS

| | | |
|---|---|---|
| CN | 101379276 A | 3/2009 |
| CN | 201786475 U | 4/2011 |
| CN | 102661193 A | 9/2012 |
| JP | 2000-352316 A | 12/2000 |
| KR | 1020050036098 | 4/2005 |
| WO | WO 2011092459 A1 * | 8/2011 |

* cited by examiner

FIG. 5A

| Case | Th(thickness) | Normalized NOx(g/kwh) |
|---|---|---|
| 1 | 1.4 mm | 1.3 |
| 2 | 1.2 mm | 1.1 |
| 3 | 1.0 mm | 1 |
| 4 | 0.8 mm | 0.96 |
| 5 | 0.5 mm | 0.94 |
| 6 | 0.2 mm | 0.91 |
| 7 | 0 | 0.91 | ated

COMBUSTION CHAMBER OF DIRECT INJECTION DIESEL ENGINE FOR REDUCING THE NOX

CROSS-REFERENCE TO RELATED APPLICATIONS

This application is based on and claims priority from Korean Patent Application No. 10-2012-0102347, filed on Sep. 14, 2012, with the Korean Intellectual Property Office, the disclosure of which is incorporated herein in its entirety by reference.

TECHNICAL FIELD

The present invention relates to a combustion chamber of a direct injection diesel engine, and more particularly, to a combustion chamber of a diesel engine for improving mixing performance of fuel and air by optimizing a shape of the combustion chamber of the diesel engine and reinforcing a squishing or swirl flow inside the combustion chamber.

BACKGROUND

In general, a gasoline engine has a principle that air and fuel are uniformly mixed before initiation of combustion, and then are ignited through an ignition plug to be combusted, and a diesel engine has a principle that air is only taken in and is compressed with a high compression ratio, and then fuel is injected to the compressed air at a high pressure, thereby reaching auto-ignition combustion.

Especially, a general diesel engine mainly adopts a method of combusting fuel by mixing the fuel and air well by making fuel injected from an injector swirl in a combustion chamber (bowl) provided at a piston.

The combustion chamber of the diesel engine needs to be designed so as to maintain low smoke and a state where smoke is not worsened even at a delay of an injection time. That is, the combustion chamber of the diesel engine needs to facilitate formation of air-fuel mixture by making injected fuel collide with a wall surface of the combustion chamber, maintain a swirl flow inside the combustion chamber, suppress a flow of fuel vapor to a squish region formed between a piston and a cylinder head, and stimulate an air flow.

The diesel engine exhibits engine performance by injecting fuel into the combustion chamber at an appropriate time and mixing the injected fuel and intake air to facilitate combustion. In this case, the injection of the fuel is started at an end stage of a compression stroke, the fuel is mixed with air by the swirl flow inside the combustion chamber from the end stage of the compression stroke to an initial stage of an explosion stroke to be combusted, and then non-combusted smoke is mixed with air at a top portion of the piston by the squish flow to be further combusted, thereby suppressing a smoke generation.

Accordingly, in order to improve engine performance and solve exhaust gas, the diesel engine needs to make the combustion chamber have an optimized shape so as to realize optimal mixing of air and fuel inside the combustion chamber.

FIG. 1 is a cross-sectional view of a combustion chamber of a diesel engine in the related art, and the diesel engine is provided with a combustion chamber 2 shaped like a bowl enabling fuel injected from an injector 3 to swirl and squish at an upper portion of a piston 1.

The piston 1 vertically moves while sliding against an inner circumferential surface of a cylinder block to compress or expand air inside the combustion chamber 2, and simultaneously the fuel injected from the injector 3 is mixed with the air.

Accordingly, when high pressure fuel is injected from the injector 3 in a state where the intake air through an intake port is compressed by an ascending movement of the piston 1, the fuel injected from the injector 3 is mixed with the air forming turbulence while creating a swirl in the combustion chamber provided on an upper surface of the piston 1.

However, the combustion chamber of the diesel engine has a problem in that swirl intensity is decreased under a condition in which the combustion chamber is operated in a low-speed operation region, such that engine performance deteriorates and particulate matters (PM) and nitrogen oxide (NOx) are increased as well in an aspect of exhaust gas.

In order to solve the problem, an effort, such as a height of the injector (fuel injection nozzle) may be adjusted, or a shape of the combustion chamber is formed to have a radial shape as can be seen in a piston structure of a diesel engine of Korean Patent Application Laid-Open No. 10-2005-0036098, has been made.

However, the combustion chamber of the diesel engine has a problem in that mixing of the fuel and the air is not smooth, causing flow stagnation, and combustion concentration is generated due to the flow stagnation, such that a temperature is partially increased, thereby increasing nitrogen oxide.

SUMMARY

An exemplary embodiment of the present invention has been made in an effort to enable fuel injected from an injector to evenly swirl or squish inside the combustion chamber by optimizing a shape of the combustion chamber.

An exemplary embodiment of the present invention provides a combustion chamber of a direct injection diesel engine including: a pip protruding from a center of a lower surface of the bowl toward the injector; a lip part protruding from a side surface of the bowl toward the injector; and a main combustion chamber provided on a lower portion of the lip part and a sub combustion chamber provided on an upper portion of the lip part with the lip part interposed therebetween, in which a surface of the sub combustion chamber is formed in a concave bowl shape to have a depth of the sub combustion chamber of 1.0 mm or lower.

The depth of the sub combustion chamber may be equal to or lower than 0.8 mm.

The depth of the sub combustion chamber may be 0.2 mm to 0.8 mm.

The depth of the sub combustion chamber may be 0.1 mm to 0.2 mm.

A diameter of the lip part may be smaller than a maximum diameter of the main combustion chamber, and the maximum diameter of the main combustion chamber may be smaller than a diameter of an entrance of the combustion chamber.

A ratio of a lip curvature center depth of the lip part to a combustion chamber maximum depth of the main combustion chamber may be 2.2 to 2.8.

The injector may be provided with a plurality of injection holes, and an angle between a fuel jet injected from the injection holes and a horizontal surface of a cylinder head may be 10° to 30°.

Another exemplary embodiment of the present invention provides a combustion chamber of a direct injection diesel engine including: a pip protruding from a center of a lower surface of the bowl toward the injector; a lip part protruding from a side surface of a bowl toward an injector; and a main combustion chamber provided on a lower portion of the lip part and a sub combustion chamber provided on an upper portion of the lip part with the lip part interposed therebetween, in which a surface of the sub combustion chamber is formed to have a flat shape, so that a highest surface of the sub combustion chamber and a lowest surface of the sub combustion chamber are equal to each other.

According to the exemplary embodiments of the present invention, first, it is possible to improve mixing performance of fuel and air with a simple configuration, compared to the related art. Second, it is possible to improve engine efficiency and reduce a generation of nitrogen oxide (NOx) by improving mixing performance of fuel and air.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 5A and 5B are a chart and a graph for a variation amount of NOx according to a depth of the sub combustion chamber.

DETAILED DESCRIPTION

Figure 1:
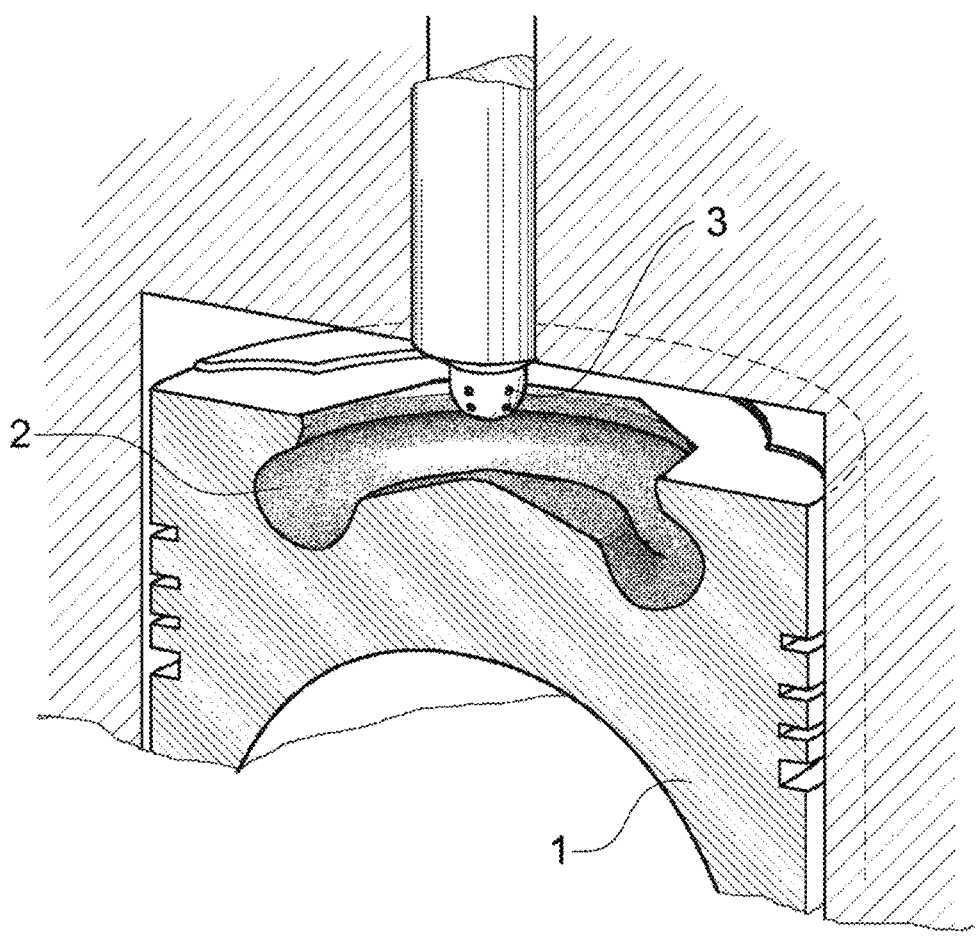
FIG. 1 is a cross-sectional view of a combustion chamber of a direct injection diesel engine according to the related art.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, a combustion chamber of a diesel engine according to an exemplary embodiment of the present invention will be described in detail with reference to the accompanying drawings so as to be easily carried out by a person of ordinarily skill in the art. The present invention is not limited to the exemplary embodiments, and may be implemented into a plurality of different forms.

A part irrelevant to the description will be omitted to clearly describe the present invention, and the same or similar elements will be designated by the same reference numerals throughout the specification.

Figure 2:
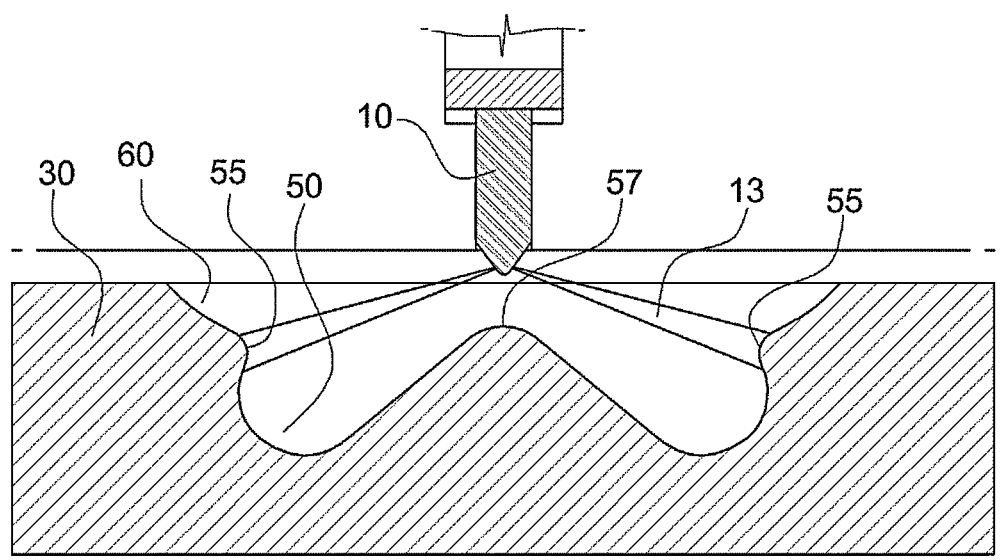
FIG. 2 is a cross-sectional view of a combustion chamber of a direct injection diesel engine according to an exemplary embodiment of the present invention.

FIG. 2 illustrates a cross-section of a combustion chamber of a diesel engine according to an exemplary embodiment of the present invention. As illustrated in FIG. 2, the combustion chamber of the diesel engine is provided with an intake port (not illustrated) through which air flows in, and an exhaust port (not illustrated) for discharging exhaust gas, and an injector 10 for injecting fuel is provided at a center portion of an upper side of the combustion chamber, and the injector 10 is commonly provided with 5 to 6 injection holes so that the fuel may be injected in all directions.

A piston 30 for compressing air is installed in the combustion chamber, and a main combustion chamber 50 and a sub combustion chamber 60 shaped like a bowl are provided on an upper surface of the piston 30 so that the fuel injected from the injector 10 swirls and squishes.

That is, when high pressure fuel is injected from the injector 10 in a state where the air taken in through the intake port (not illustrated) is compressed by an ascending of the piston 30, the fuel injected from the injector 10 forms turbulence while creating a swirl in the main combustion chamber 50 and the sub combustion chamber 60 provided on the upper surface of the piston 30 so as to be mixed with the air.

Further, a pip 57 is formed at a center portion of the upper surface of the piston 30, and the pip 57 protrudes from the upper surface of the piston 30 toward the injector 10 as illustrated in FIG. 2.

Since an upper end surface of the pip 57 is formed to be lower than an upper end surface of the piston 30, a combustion chamber provided between the pip 57 and a lower surface of a cylinder head is provided to have a smaller depth than that of a combustion chamber formed by another upper end surface of the piston 30.

The combustion chamber is provided to have a bowl shape, in such a manner that the combustion chamber may be divided into the main combustion chamber 50 surrounding the pip 57 and the sub combustion chamber 60 surrounding the main combustion chamber 50.

A lip part 55 is provided between the main combustion chamber 50 and the sub combustion chamber 60, and the lip part 55 protrudes toward the center portion of the combustion chamber and the injector 10 to divide the combustion chamber into the main combustion chamber 50 and the sub combustion chamber 60.

The sub combustion chamber 60 may secure uniform symmetry by forming an entrance of the sub combustion chamber 60 to have a circular shape or an ellipsoidal shape, so that an eccentric load for the piston may also be resolved.

The lip part 55 may be provided at the same height as that of the pip 57, and may have a plurality of protrusions if necessary. Further, the lip part 55 may be provided to have a shape corresponding to an injection form of a fuel jet 13 so as to make the fuel injected from the injector 10 swirl, or the shape of the protrusions may be variously changed so as to distribute the amount of fuel injected from the injector 10 differently to each of the main combustion chamber 50 and the sub combustion chamber 60.

The fuel jet 13 injected from the injector 10 first collides with the lip part 55 and the fuel colliding with the lip part 55 flows in the main combustion chamber 50 and the sub combustion chamber 60, so that the air and the fuel inside the combustion chamber may be evenly mixed.

A direction of the plurality of injection holes provided at the end portion of the injector 10 may be adjusted so that the fuel is injected toward the lip part 55. Diameters and injected flow rates of the injection holes may be different from each other.

The injector 10 has the plurality of injection holes, and an angle A between the fuel jet 13 injected from the injection holes and a horizontal surface of the cylinder head may be 10° to 30°.

Further, the injector 10 may be provided to be vertically movable, so that a flow direction of the fuel injected from the injection hole may be adjusted, and an injection direction of the injection hole may be variously changed so that the fuel jet 13 and the lip part 55 effectively collide with each other, and thus the injected fuel swirls and squishes.

Further, a needle valve (not illustrated) is provided inside the injector 10, and thus a flow path is opened and closed by a vertical sliding movement of the needle valve, so that spray of the fuel and a stop of spray of the fuel from the injection holes may also be executed.

Figure 3:
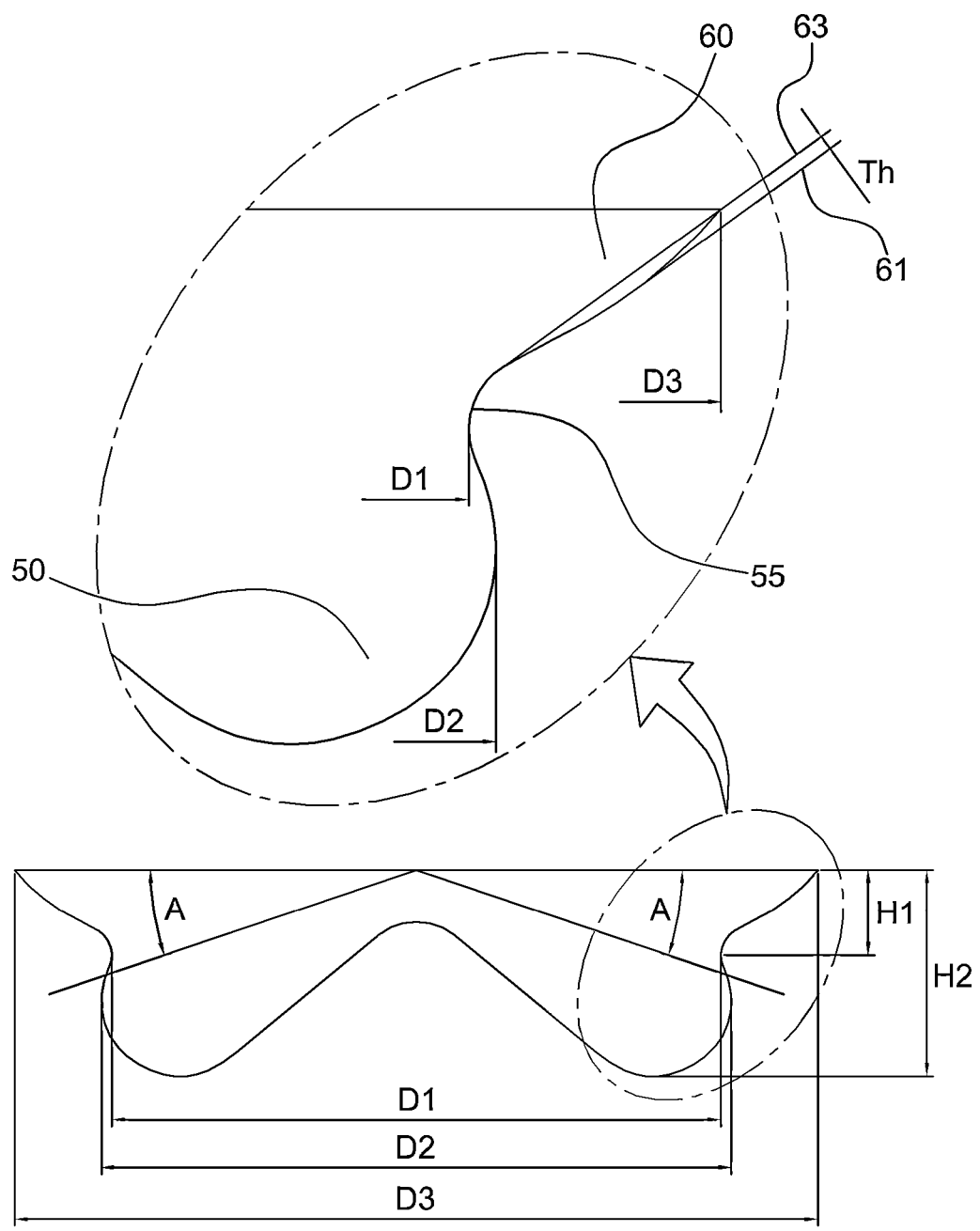
FIG. 3 is an explanatory diagram for the combustion chamber and a sub combustion chamber of the direct injection diesel engine according to an exemplary embodiment of the present invention.

FIG. 3 is for the purpose of describing the combustion chamber of the direct injection diesel engine according to an exemplary embodiment of the present invention, and hereinafter, a shape and a size of the configuration of each combustion chamber will be described below.

A diameter of the lip part of the combustion chamber formed by the lip part 55 is referred to as D1, a main combustion chamber maximum diameter formed by the main combustion chamber 50 is referred to as D2, and a combustion chamber entrance diameter is referred to as D3. Further, a lip depth from the entrance of the combustion chamber to the lip part is referred to as H1, and a combustion chamber maximum depth is referred to as H2.

Accordingly, as illustrated in FIG. 3, the combustion chamber of the diesel engine according to an exemplary embodiment of the present invention has a relationship of D3>D2> and D1, and a relationship of H2>H1, and sizes of D1, D2, D3, H1, and H2 may be variously modified and worked according to a selection if necessary.

Further, a ratio H2/H1 of the lip curvature center depth H1 of the lip part 55 to the combustion chamber maximum depth H2 of the main combustion chamber 50 may be 2.2 to 2.8.

The sub combustion chamber 60 is discriminated from the main combustion chamber 50 by the lip part 55, and the sub combustion chamber 60 may be provided in a concave bowl shape similar to the main combustion chamber 50, and may be provided in a plane if necessary.

That is, in order to form the surface of the sub combustion chamber 60 to have a flat shape, a highest surface 63 of the sub combustion chamber and a lowest surface 61 of the sub combustion chamber need to be equally provided.

In a case where the sub combustion chamber 60 is provided in the bowl shape, a depth of the sub combustion chamber is referred to as Th, and the depth Th of the sub combustion chamber may be equal to or lower than 1 mm.

As illustrated in FIG. 3, the depth Th of the sub combustion chamber refers to a distance between a tangent line connecting the concave portions of the lip part 55 and a lowest bottom surface of the sub combustion chamber 60 at a point at which the sub combustion chamber 60 meets the upper surface of the piston.

A size between the lowest surface 61 of the sub combustion chamber and the highest surface 63 of the sub combustion chamber may be equal to or lower than 0.8 mm so that the depth Th of the sub combustion chamber has a depth equal to or lower than 0.8 mm. Further, the depth Th of the sub combustion chamber may be 0.2 mm to 0.8 mm. In addition, the depth Th of the sub combustion chamber may be 0.1 mm to 0.2 mm if necessary.

Further, the surface of the sub combustion chamber 60 is formed to have a flat shape, so that the highest surface 63 of the sub combustion chamber and the lowest surface 61 of the sub combustion chamber may be equally provided.

Further, in a case where it is impossible to measure the depth Th of the sub combustion chamber 60, that is, a structure in which the sub combustion chamber 60 does not have the bowl shape, but has a convex shape toward the center portion of the combustion chamber, the sub combustion chamber may be provided to have the shape of the combustion chamber in the related art. The shape of the combustion chamber in the related art has a problem in that the mixing of the air and the fuel is incomplete, such that a large amount of exhaust gas is discharged.

Figure 4A:
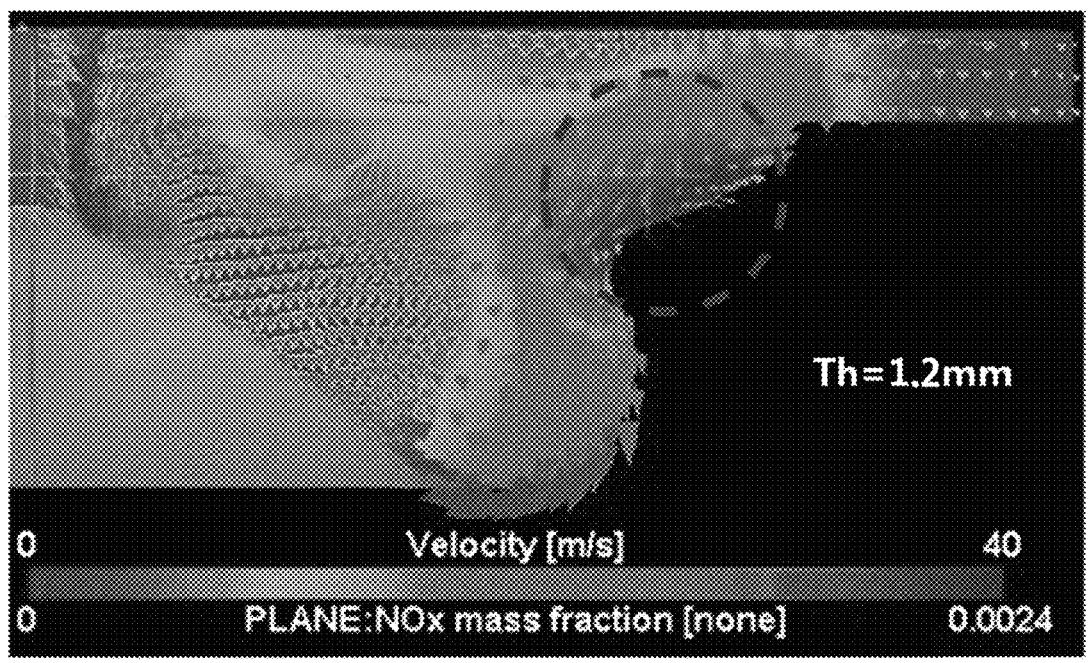
FIGS. 4A and 4B are explanatory diagrams for a variation amount of NOx according to a depth of the sub combustion chamber.
Figure 4B:
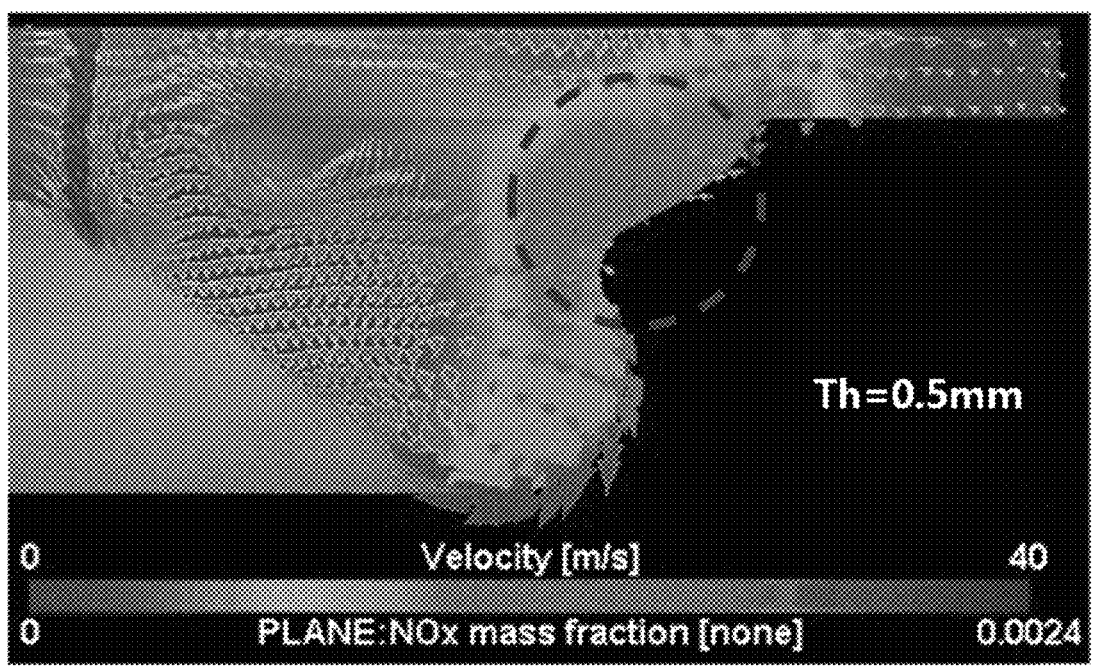

As described above, an effect of decreasing the amount of generated nitrogen oxide achieved by improving the mixing performance of the air and the fuel by optimizing the depth of the sub combustion chamber 60 and thus evenly performing the combustion can be seen from FIGS. 4A and 4B representing a result of an experiment by the applicant.

FIG. 4A illustrates the amount of generated nitrogen oxide in a case where the depth of the sub combustion chamber 60 is set to 1.2 mm, and referring to a portion with a dotted line, that is, the sub combustion chamber 60, it can be seen that combustion is concentrated due to flow stagnation of the fuel and the air, and thus a temperature is increased, thereby increasing the amount of generated nitrogen oxide.

On the contrary, FIG. 4B illustrates a case where the depth of the sub combustion chamber 60 is set to 0.5 mm, and it can be seen that the air and the fuel is mixed well in a part with a dotted line, that is, the sub combustion chamber 60, so that the combustion is evenly generated and thus the amount of generated nitrogen oxide is noticeably decreased.

Figure 5B:
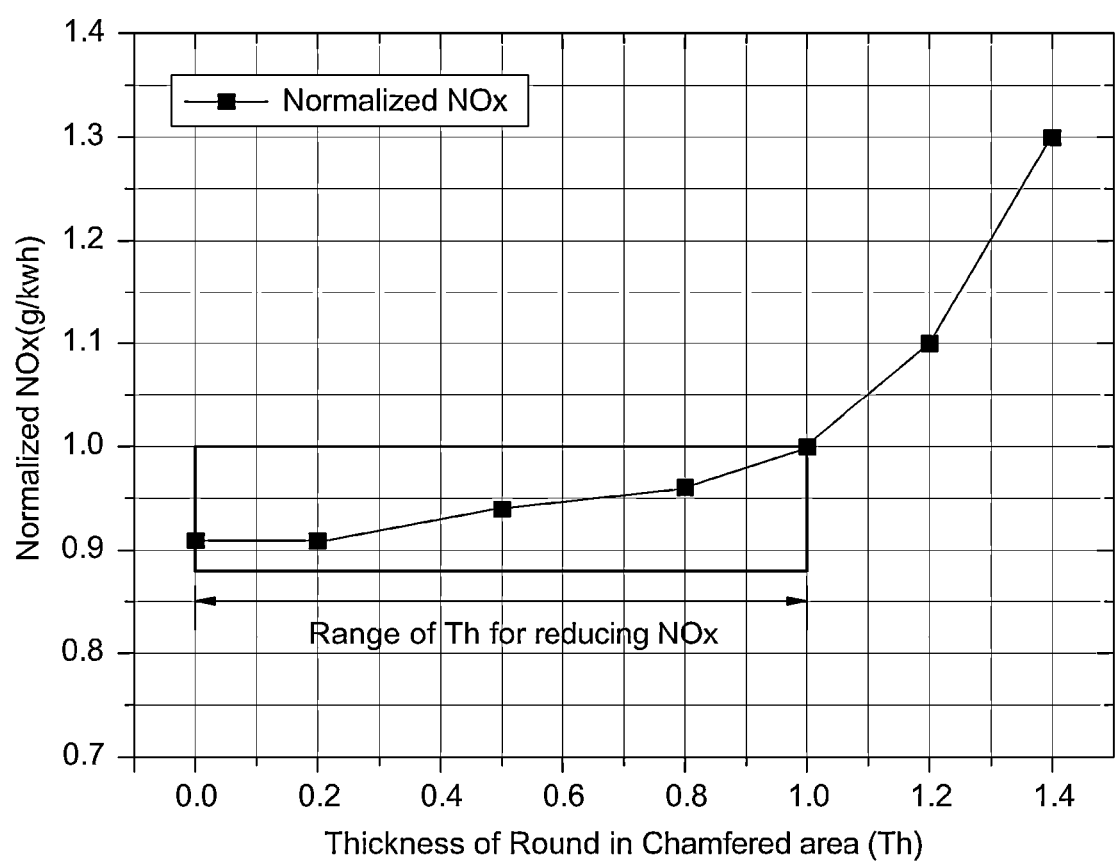

FIGS. 5A and 5B express result values of the experiment as a table and a graph. Referring to the chart of FIG. 5A, it can be seen that when the depth of the sub combustion chamber 60 is decreased from 1 mm, the amount of generated nitrogen oxide is also decreased.

Further, it can be seen that there is no change in the amount of generated nitrogen oxide from the moment at which the depth of the sub combustion chamber is 0.2 mm during the decrease in the depth of the sub combustion chamber from 1 mm. Accordingly, when the depth of the sub combustion chamber 60 is 0.2 mm, the optimum effect may be achieved.

As illustrated in FIG. 5B, it can be seen that a relationship between the depth of the sub combustion chamber and the amount of generated nitrogen oxide is an inverse proportion, and an inclination of the graph representing a degree of a decrease in the nitrogen oxide is sharply increased when the depth of the sub combustion chamber is larger than 1.2 mm.

Further, it can be seen that the degree of decrease in the nitrogen oxide is almost uniformly decreased in a section between the depth of 0.8 mm to 0.2 mm of the sub combustion chamber. However, in view of the fact that there is no change in the amount of generated nitrogen oxide when the depth of the sub combustion chamber is equal to or lower than 0.2 mm, it can be seen that the depth of the sub combustion chamber equal to or lower than 0.2 mm is not associated with the amount of generated nitrogen oxide.

An exemplary embodiment of the present invention may be used in a combustion chamber of a diesel engine for improving mixing performance of fuel and air by optimizing a shape of the combustion chamber of the diesel engine.

From the foregoing, it will be appreciated that various embodiments of the present invention have been described herein for purposes of illustration, and that various modifications may be made without departing from the scope and spirit of the present invention. Accordingly, the various embodiments disclosed herein are not intended to be limiting, with the true scope and spirit being indicated by the following claims.

What is claimed is:

1. A combustion chamber of a diesel engine provided with a bowl having a concave shape so that fuel injected from an injector is mixed with air, the combustion chamber comprising:

a pip protruding from a center of a lower surface of the bowl toward the injector;

a lip part protruding from a side surface of the bowl toward the injector; and a main combustion chamber provided on a lower portion of the lip part and a sub combustion chamber provided on an upper portion of the lip part, with the lip part interposed therebetween, wherein a surface of the sub combustion chamber is formed in a concave bowl shape optimized to reduce generation of nitrogen oxide by causing the fuel injected from the injector to swirl and squish by having a depth of the sub combustion chamber of 1.0 mm or lower.

2. The combustion chamber of claim 1, wherein the depth of the sub combustion chamber is equal to or lower than 0.8 mm.

3. The combustion chamber of claim 2, wherein the depth of the sub combustion chamber is 0.2 mm to 0.8 mm.

4. The combustion chamber of claim 1, wherein a diameter of the lip part is smaller than a maximum diameter of the main combustion chamber, and the maximum diameter of the main combustion chamber is smaller than a diameter of an entrance of the combustion chamber.

5. The combustion chamber of claim 1, wherein a ratio of a lip curvature center depth of the lip part to a combustion chamber maximum depth of the main combustion chamber is 2.2 to 2.8.

* * * * *